Aug. 27, 1946. T. W. OGLESBY 2,406,625
AIRPLANE
Filed Dec. 10, 1941 10 Sheets-Sheet 1

Inventor;
T. W. Oglesby.
By A. Yates Dowell
Atty.

Aug. 27, 1946. T. W. OGLESBY 2,406,625
AIRPLANE
Filed Dec. 10, 1941 10 Sheets-Sheet 3

Inventor,
T. W. Oglesby.

A. Yates Dowell

By Atty.

Aug. 27, 1946.  T. W. OGLESBY  2,406,625
AIRPLANE
Filed Dec. 10, 1941   10 Sheets-Sheet 4

Inventor,
T. W. Oglesby.
By A. Yates Dowell
Atty.

Aug. 27, 1946.    T. W. OGLESBY    2,406,625
AIRPLANE
Filed Dec. 10, 1941    10 Sheets-Sheet 5

Inventor,
T. W. Oglesby.
A. Yates Dowell
By    Atty.

Aug. 27, 1946.  T. W. OGLESBY  2,406,625
AIRPLANE
Filed Dec. 10, 1941    10 Sheets-Sheet 7

Inventor:
T. W. Oglesby.
A. Yates Dowell
Atty.
By

Aug. 27, 1946.   T. W. OGLESBY   2,406,625
AIRPLANE
Filed Dec. 10, 1941   10 Sheets-Sheet 8

Inventor,
T. W. Oglesby.
By H. Yates Dowell
atty.

Aug. 27, 1946.  T. W. OGLESBY  2,406,625
AIRPLANE
Filed Dec. 10, 1941  10 Sheets-Sheet 9

INVENTOR:
T. W. Oglesby.
A. Yates Dowell
By  Atty.

Aug. 27, 1946.   T. W. OGLESBY   2,406,625
AIRPLANE
Filed Dec. 10, 1941   10 Sheets-Sheet 10

Inventor:
T. W. Oglesby
By A. Yates Dowell
Atty.

Patented Aug. 27, 1946

2,406,625

UNITED STATES PATENT OFFICE 2,406,625

AIRPLANE

Thomas W. Oglesby, Peru, Ind.

Application December 10, 1941, Serial No. 422,428

31 Claims. (Cl. 244—13)

This invention relates to aeronautics and more particularly to airplane construction.

In airplane construction it has been recognized that plural lifting surfaces or wings in alignment or substantially so would result in certain definite advantages if a practical design could be evolved. Early experiments indicated that one wing in rear of another would not work satisfactorily because the air from the first wing was deflected downwardly by the action of that wing, and therefore the second wing should be set at a greater angle of attack to obtain a satisfactory lift. However, when this was done, the second wing caused trouble since an adjustment was necessary after each change in speed and the drag was excessive at high speeds. Turbulence of the air behind the first wing caused loss of lift by tending to equalize the pressure on both surfaces of the second wing. Other objectionable factors include instability, excessive weight resulting from the number of spars, ribs, struts, and the like to impart the required strength to the wing structure, cooling of the motors, the difficulty encountered in arranging the propellers and motors to coact with the wings to obtain maximum lift and maneuverability, tip vortices, and other factors of both major and minor importance. The inability in the past to devise a practical multi-wing-in-line airplane has limited the size of airplanes, and has also placed a definite limit on streamlining and the number of motors used. The latter factor affects the safety of the plane since it is obvious that the danger of loss of control and forced landings is less when the required horse power is distributed over a plurality of motors in contradistinction to where the horsepower is concentrated in one or a relatively few motors.

Not only have the possibilities of multi-wing-in-line planes been recognized but it has also been recognized that there are advantages in propellers operating in pairs and coacting to exert a driving force in the same direction, but here again progress has been hindered due to the lack of a practical design of plane to support this arrangement.

An object of the present invention is to provide an airplane comprising a plurality of coordinated lifting surfaces or wings arranged in alignment or substantially so and having a high degree of stability, efficiency and strength.

Another object is to provide what is herein termed a "multi-wing-in-line" plane wherein motors with the propellers may be mounted to coact with the wings of the plane in such a manner as to obtain maximum lift, cooling efficiency, stability and other advantageous factors.

Another and more specific object is to provide an airplane having a motor mounted within and shielded by a fuselage or other hollow body to thereby avoid wind resistance, the motor being cooled by air circulated through a particular arrangement of hollow wings and reinforcing tubes therefor under full control.

Other important objects include:

The provision of a multi-wing-in-line plane with the fuselage mounted centrally of the plane and the wings reinforced and balanced with respect to the fuselage to obtain strength without sacrificing maneuverability;

To provide a multi-wing-in-line plane having reinforcing at the outer end of the wings which avoids tip vortices and at the same time forms part of a cooling system for the motor or motors;

To provide a plane of the type specified wherein the required horse power may be handled by a relatively large number of motors without loss of efficiency;

To provide an airplane design which will render possible effective streamlining of fuselage and motors irrespective of the type of motors used;

To reduce ice-formation hazards;

To lower manufacturing costs;

To reduce weight while maintaining ample strength;

And to generally improve and render more practical heavier-than-air craft construction.

Referring to the drawings in detail, and first to Figs. 1 to 6, inclusive, an airplane illustrative of the invention comprises a fuselage or analogous elongated hollow body generally indicated at 10 and which may be divided into any number of compartments arranged in any suitable manner. At the front extremity of the fuselage there is provided a pilot and/or passenger compartment 11 wherein the various controls may be located and which are not shown since any suitable control mechanism may be used. At the rear extremity of the fuselage an additional compartment 12 which may be utilized to accommodate passengers, freight, or if the plane be of military type, a gun mount or for any other suitable purpose. The tail of the fuselage may be provided with a rudder 13 controlled from the pilot's compartment. The intermediate portion of the fuselage defines a compartment 14 having a series of motors 15, 16, 17 and 18 mounted therein. Above the motors are air scoops or inlets 19 for admitting air to the motors in addition to that afforded by the regular cooling system hereinafter described if desired or found necessary. These inlets may be provided with closures adjustable to regulate the openings defined thereby.

Figure 4:
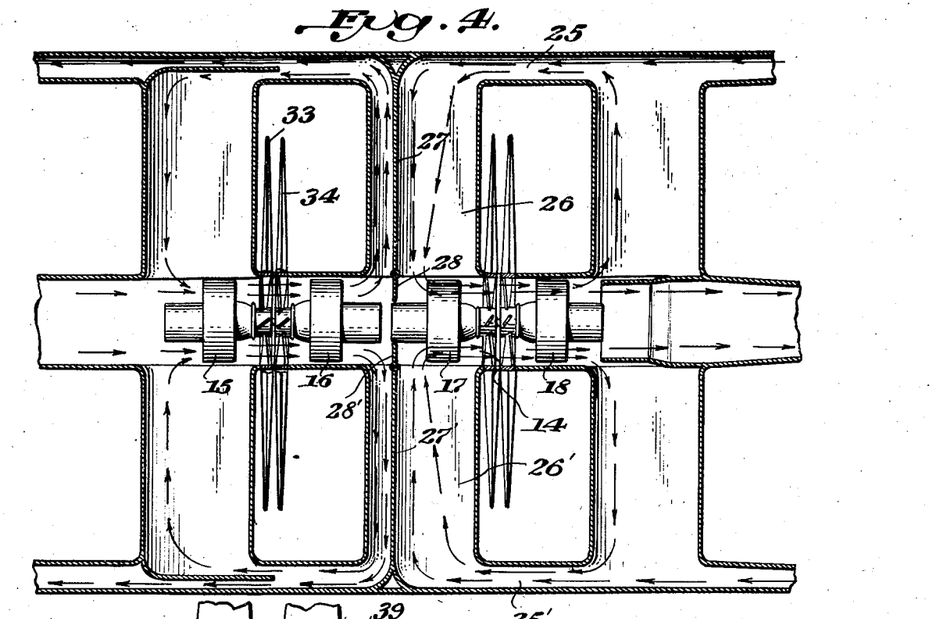
Fig. 4 is an enlarged sectional plan view of the central portion of the plane, particularly illustrating the mounting of the motors with their coacting propellers and the circulation of air through the hollow wings and reinforcing tubes.

Projecting laterally from the central hollow body 10 are a series of lifting surfaces or wings 20, 20', 21, 21', 22, 22' and 23, 23', said wings in whole or in part being of hollow construction as is best shown in Fig. 4.

At their outer ends, the wings are connected longitudinally of the plane by elongated tubular reinforced members 24 and 24', the said members defining air-circulating ducts 25 and 25', which in connection with ducts 26 and 26' provide a path for the circulation of air from the motor compartment 14 to effect cooling of the motors as will be more fully hereinafter explained. The tubes 24 are preferably provided with longitudinal fins 24a to eliminate or reduce "tip vortices" in a manner to be described.

The cooling system is preferably divided into a plurality of separate circulating channels by means of partitions 27 and 27', any desired number of which may be provided and having at their inner ends control valves 28 and 28', said valves being under the control of the pilot or pilots in any suitable manner, either manual or automatic.

Figure 1:
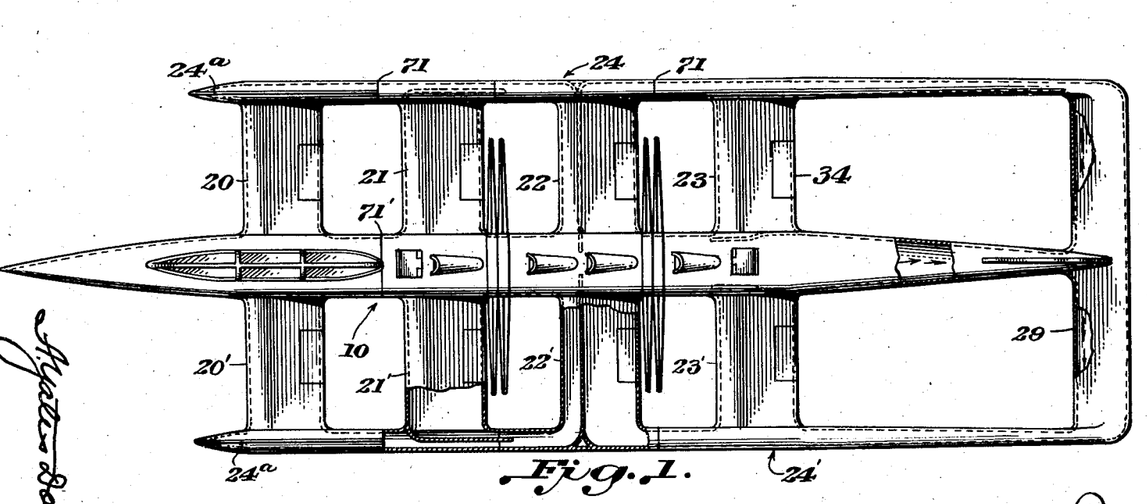
Figure 1 is a top plan view of an airplane illustrative of the present invention.
Figures 3, 9, 13, 14:
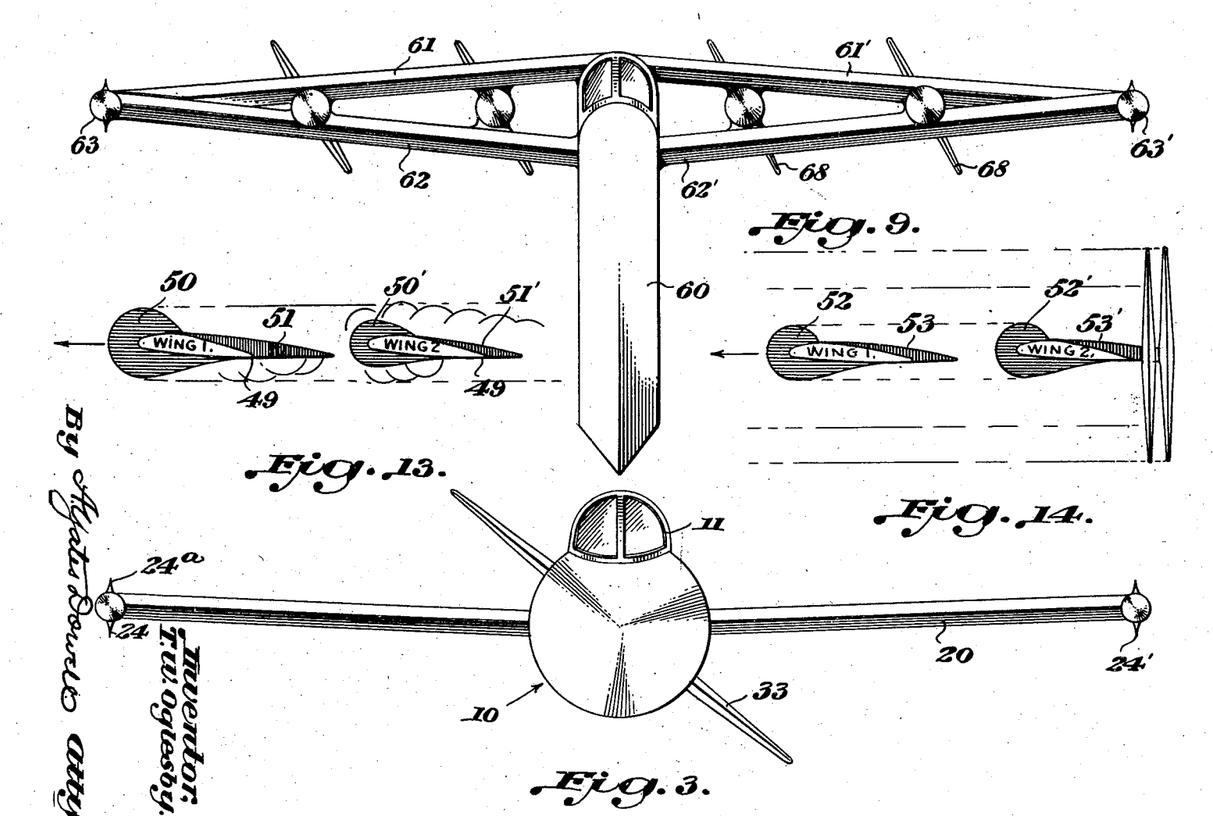
Fig. 3 is a view in front and elevation of the plane of Figs. 1 and 2.
Figs. 7, 8 and 9 are, respectively, views in top plan, side and end elevation of a large liner or heavy bomber type of multi-wing-in-line plane.
Figs. 13 and 14 are diagrammatic views illustrating, respectively, the action of a pair of aligned wings in free air and with propellers mounted in rear thereof.
Figure 7:
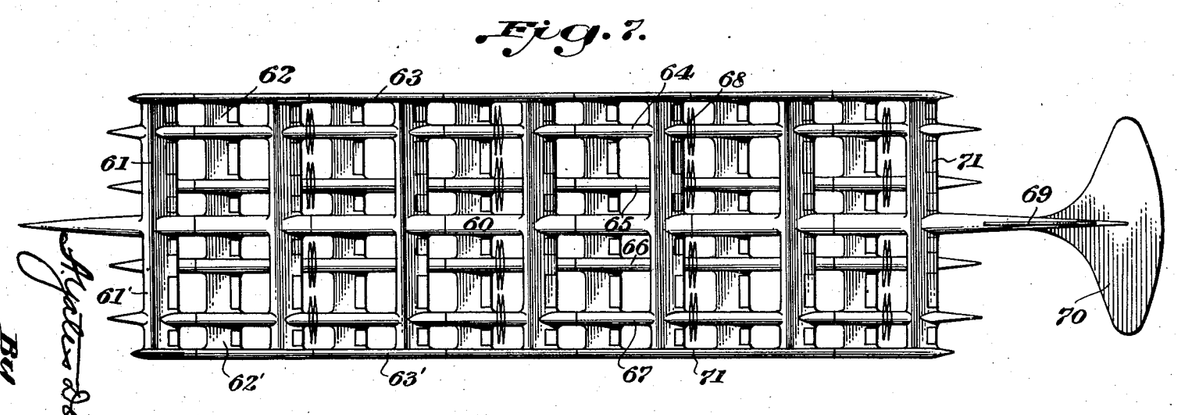
Figure 8:
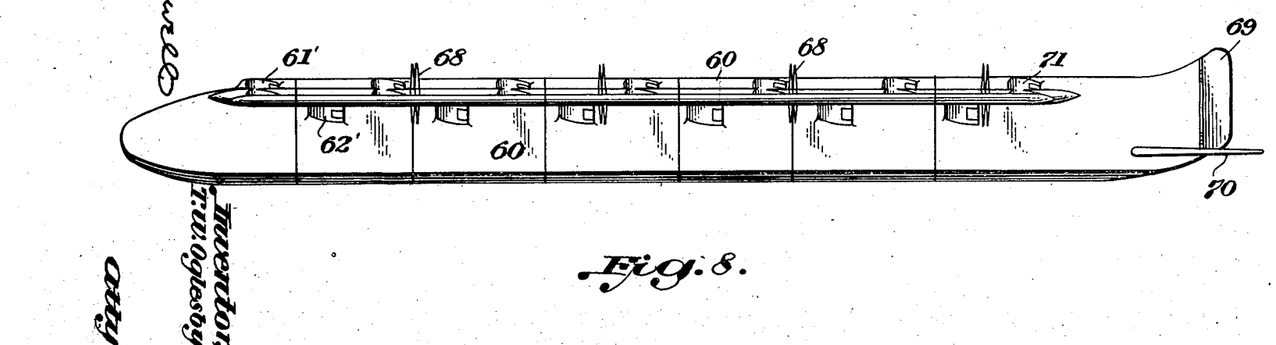

As shown in Fig. 1, there are four lifting surfaces or wings provided in the example used for the purpose of illustration, but it will be apparent that any number of wings may be provided in accordance with the size of the plane and which is exemplified in the modification shown in Figs. 7, 8 and 9, to be more fully described.

The wing connecting and reinforcing members 24 and 24' are cross connected at the rear ends by a tail piece 29 which is also of hollow construction and in conjunction with the said tubular members provides ducts for the circulation of air and constitutes part of the cooling system, note Fig. 1.

Figure 6:
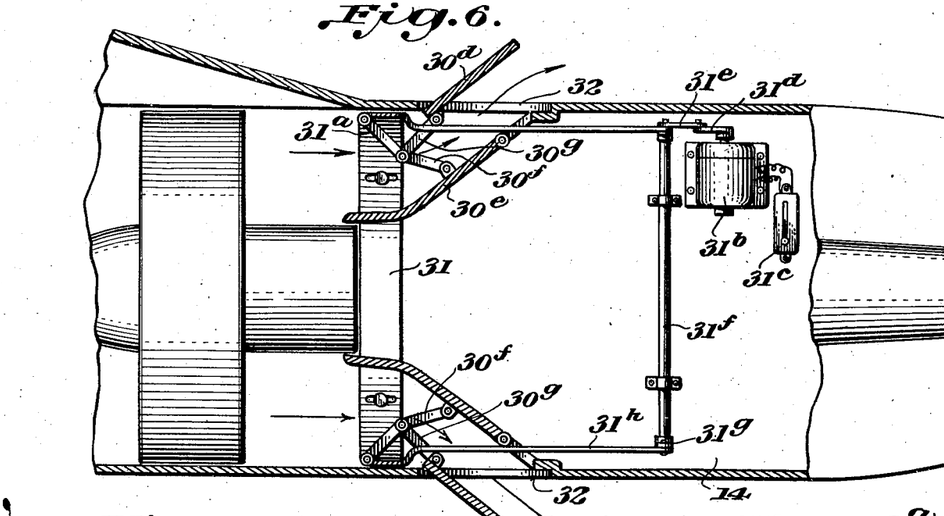
Figs. 6 and 6a are enlarged fragmentary views of a portion of the fuselage of the plane, particularly illustrating the control valves for regulating the amount of atmospheric air admitted to the cooling system.

To control the amount of atmospheric air admitted into the cooling system and to also definitely regulate the cooling temperature of the air in the system, valve assemblies 30, 30a, 30b and 30c are mounted at the opposite ends of the motor compartment 4, each assembly preferably being constructed as shown in Fig. 6 and consisting of coacting outer and inner vanes or flaps 30d, 30e connected to one another by links 30f and 30g and to an operating ring 31 by link 31a. These valves or vanes are adapted to regulate the amount of air admitted through ports or openings 32 formed in the wall of the hollow body 10.

The ring is slotted and mounted on headed studs or bolts for limited sliding movement in the compartment 14 of the fuselage. To actuate or reciprocate the ring, a motor 31b is provided and is preferably automatically controlled by the thermostatic switch unit 31c, adapted to start or stop the motor in accordance with a predetermined temperature setting. Motor 31b connects with ring 31 by means of crank 31d and arm 31e secured on end of shaft 31f, the latter carrying crank arms 31g which pivotally connect with links 31h in turn connected to ring 31. Any number of valve units may be employed around the compartment 14 under the control of ring 31.

Figure 6A:
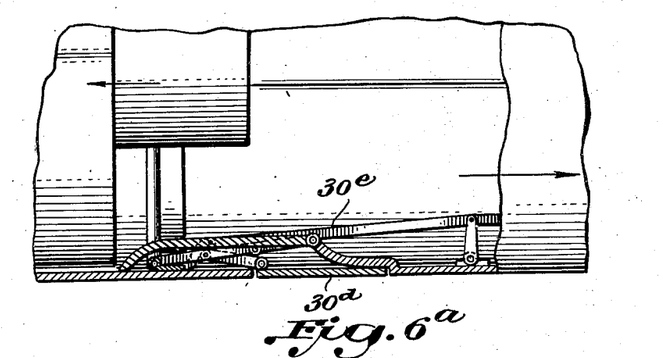

It will be seen that when the motor compartment reaches a certain temperature, thermostat 31c will start motor 31b and actuate valve flaps or vanes 30d and 30e through ring 31. Fig. 6a shows the flaps in closed position.

Figure 2:
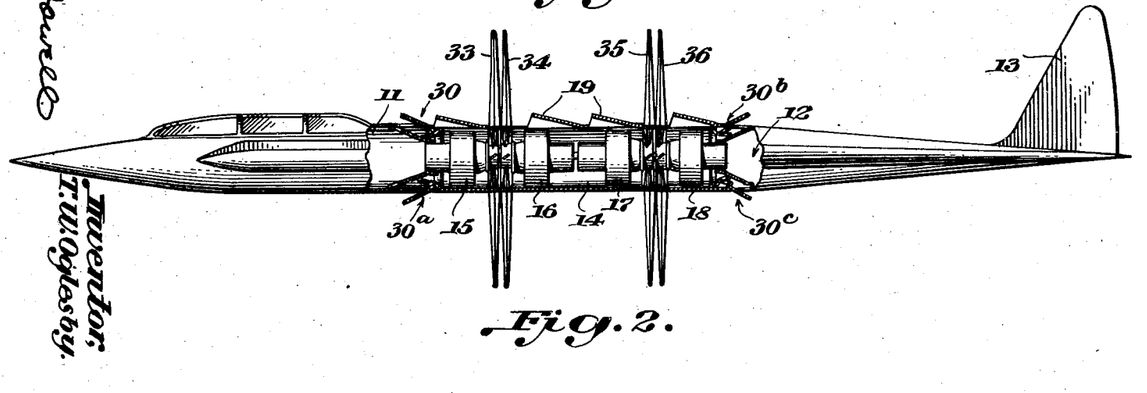
Fig. 2 is a view in section and side elevation of Fig. 1.

As is best shown in Figs. 2 and 4, the motors

15—18 are fully enclosed in the compartment 14 and offer no impediment to a full streamline design. These motors are provided with individual propellers 33, 34, 35 and 36 which are designed to rotate in different directions but exert a unidirectional propulsion on the air stream. This may be done, as will be understood, by properly canting or shaping the blades of the propellers. The advantages of this arrangement will be referred to more fully in the subsequent description.

Figure 5:
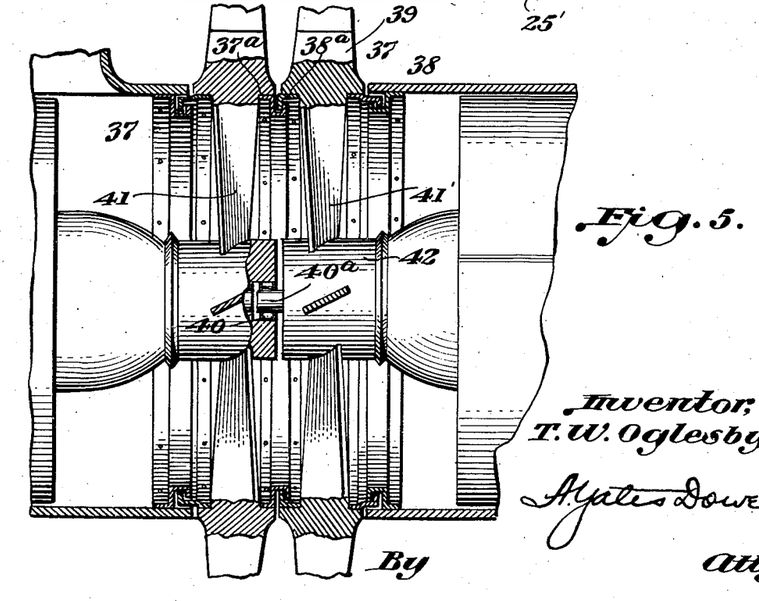
Fig. 5 is a view of the hub portions of the propellers, particularly illustrating the air circulating fans or blades forming part of the cooling system.

At the point in the motor compartment section of the fuselage where the propeller hubs rotate, the shell is separated as best shown in Fig. 5, and at the points of separation is preferably provided with flanges 37 adapted to telescope into flanges 38 secured to the hub 39 of the respective propellers and reduce loss of air from the cooling system at this point to a minimum. Like flanges 37a and 38a are secured to the propeller hubs between adjacent propellers.

The divided fuselage is braced and reinforced primarily by the outer tubular members 24 and 24'. However, additional reinforcing and stabilizing structure may be provided if found desirable or necessary. As for instance one propeller hub axis or center may be provided with a bearing 40 to receive a shaft end 40a projecting from the center of the adjacent propeller hub.

Means for setting up a forced circulation of air through the cooling system is provided and preferably comprises a series of fans indicated at 41 and 41' in Fig. 5, the blades of which are struck or projected outwardly from the hub centers or drive shafts 42 of the motors and may constitute spider arms for effecting a driving connecting between said drive shafts and the propellers. It is preferred to construct a fan in each propeller hub 39 although any number may be provided commensurate with the desired capacity of the cooling system.

Figure 12:
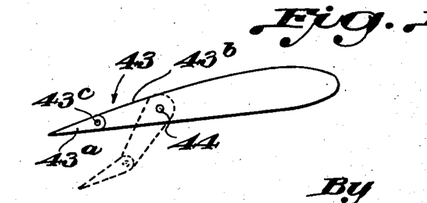
Fig. 12 illustrates a preferred type of aileron.

Each or any selected number of the wings 22—23' may be provided with individual ailerons generally indicated at 43 and one of which is shown more or less in detail in Fig. 12. These ailerons may comprise control vanes or flaps 43a and 43b which are pivotally connected to one another at 43c, the flap 43b in turn being mounted on a pivot 44 within the trailing edge of its wing. Any suitable control mechanism may be used for the ailerons, a preferred type being illustrated in Figs. 18, 19 and 20 to be described.

The flow channels of the air are indicated in Figs. 1 and 4. The fans 41 and 41' in the hubs of the propellers set up a forced circulation of air outwardly through the wings and thence through the reinforcing tubes and back to the fuselage, the valves 28, 28' serving as baffles to direct the air into the wing sections. Also, air is forced rearwardly through the tail of the central body 10 and into the tail piece 29, at which point it divides and returns to the motor compartment through the tubes 24 and 24'. As the air flows through the hollow wings and reinforcing tubes, it is subjected to cooling or heat exchange, and which cooling may vary considerably depending upon the temperatures encountered by the moving plane. Also, the circulating air may serve to heat the surfaces of the wings and tubes and eliminate or reduce ice formation.

The rate of speed of cooling is in direct proportion to the area of surface exposed to the atmosphere. By the design herein disclosed, ample exposed cooling surface is available to obtain efficient cooling over a wide range of temperatures. By regulating the valves 30, 30c, the system may be completely closed or opened to the atmosphere. When these valves are closed, heat exchange or transfer takes place solely by conduction, whereas when they are opened to varying degrees, heat transfer takes place through conduction and convection. Wind resistance is of course reduced to a minimum when the valves are fully closed but it will be noted that the arrangement is such as to offer a minimum amount of resistance to air flow, due to the fact that deflector wings or blades 30d and 30e cause the air to flow smoothly through the motor compartment.

Due to the fact that the propeller blades start well out from the hubs of the propellers, the tendency for ice to accumulate on the propeller blades is also reduced to a minimum, since it is known that the heat created by air friction within a certain radius surrounding the hub is sufficient to prevent ice formation within this radius. Also, larger propellers can be made stronger due to the fact that the blades start well out from the center of the drive shaft.

Figure 10:
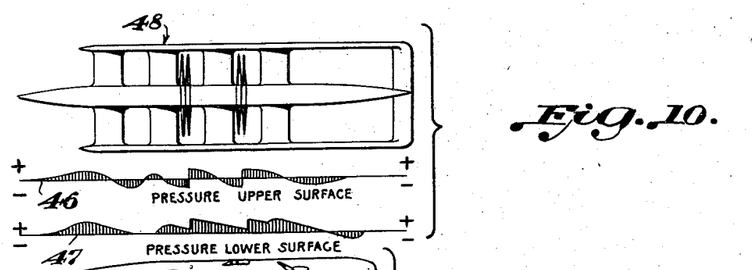
Fig. 10 is a diagrammatic representation of the air pressures encountered by a plane of the type herein disclosed.

The following observations are not to be construed as limitations since it is extremely difficult if not impossible to make satisfactory tests in the conventional wind tunnel. Hence, these observations are based partly on theory and may be in error in certain respects:

Fig. 10 represents diagrammatically the different pressures encountered by a multi-wing-in-line plane of the type herein disclosed. The axial lines at 46 and 47 represent the upper and lower surface area respectively of the plane generally indicated at 48, and the shaded areas above and below these lines represent the varying pressures encountered by these surfaces. It will be noted that the pressures on the lower surface are predominately lift, while the same is true with respect to the pressures on the upper surfaces. This also indicates why in an ordinary wind tunnel where an effort is made to equalize the flow and speed of the pressure of the air, it would be difficult to make a test of a plane of the multi-wing-in-line type. These pressures are influenced by the location and action of the propellers. When a propeller operates it creates a low pressure area in front or in advance thereof and a high pressure area in rear. The low pressure area extends to the face of the blades, and all air in front of the propeller is held in a fairly smooth state regardless of other factors which would normally influence air currents. Air tends to move toward the low pressure area created by the propeller in a straight line.

The high pressure area in back of the propeller is made slightly turbulent by the action of the propeller blade section, and this pressure is reduced slowly in the rear of the last propeller and affects the air for a considerable distance in rear of the plane. It is impractical to place a wing far enough in rear of a plane to be back of the affected area. The pressure behind the blades tends to move the air in the direction of least resistance, which kills part of the lift of the wing due to added pressure on the upper surfaces of the wing.

In Fig. 13 an attempt is made to illustrate the action of aligned wings in free air. From points 49 and 49' back, or to the right as viewed in Fig. 13, turbulence of the air is set up in the high pressure areas, indicated at 50 and 50', tending to equalize the vacuum created in the low pressure areas, indicated at 51 and 51'. Two forces fight for control, viz: The force of deflected air in motion and the tendency of the high pressure air to move to the low pressure area. The lower surface of wing 2 is in the equalizing zone of wing 1. It is difficult to obtain lift in turbulent areas as the pressures on the lower and upper surfaces tend to equalize.

Fig. 14 is an attempt to illustrate the action of a pair of aligned wings with propellers in rear thereof. The high pressure areas are here indicated at 52 and 52', the low pressure areas at 53 and 53', the pressures in the area in line with the propeller blades and designated by straight lines are below atmospheric. The rotating propellers tend to straighten out flow of air by permitting expansion in a horizontal direction more easily than in other directions, thereby reducing turbulence.

The rotation of propellers in opposite directions has an important influence in stabilizing the plane, since there is a gyroscopical action which tends to balance torque. This gyroscopical action also reduces the tendency to roll and which tendency would otherwise be particularly dangerous during the take-off, where the increased friction on one wheel, or that carrying the load, ofttimes causes a plane to turn in that direction and produces an uncontrollable ground loop. Furthermore, rotation of the propellers in opposite directions forces the slipstream straight back, further assisting in balancing the plane at all speeds and reducing the drag. In Fig. 2, the center of lift and gyroscopic action lies in the area intermediate the two sets of propellers.

Figure 15:
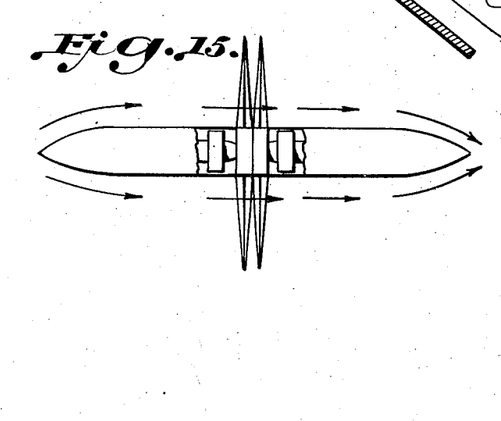
Fig. 15 illustrates diagrammatically the action of the air currents when a pair of motors are placed in alignment within a streamlined body in accordance with the present invention.
Figure 15A:
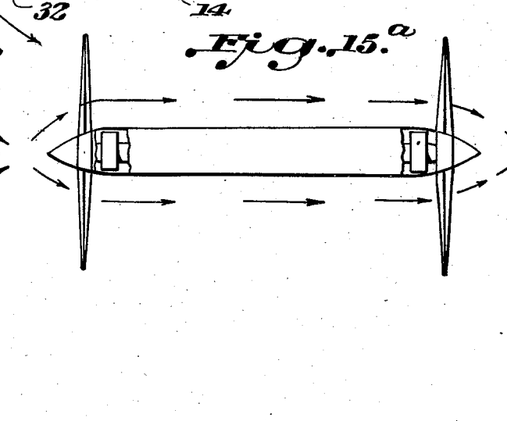
Fig. 15a illustrates the action when the motors are placed at opposite ends of the body.

The design of my improved plane whereby the motors may be enclosed in a hollow streamline body and cooled by air circulated through the interior of the plane permits the location of the propellers at an intermediate point along the body and does not require the motors to be located at the ends of the body to obtain the necessary cooling. Fig. 15 shows the action of the air stream when motors are housed within a hollow streamlined body with propellers rotating in opposite directions in closely spaced relation. It will be noted that the air stream is directed substantially straight back by the propellers, resulting in greater efficiency. Fig. 15a, shows the action when the motors and propellers are mounted at the ends of a fuselage or other hollow body, the air being compressed at the nose of the fuselage while at the same time it is being worked on by the propeller, the latter throwing the air at an angle rather than straight back. The efficient action of the back propeller is interfered with by the air trying to follow the receding surfaces at this point. When the motors and propellers are positioned as in Fig. 15, the fuselage or hollow body can be designed with a full streamline effect, the mounting of the motors not hindering the design.

Figure 16:
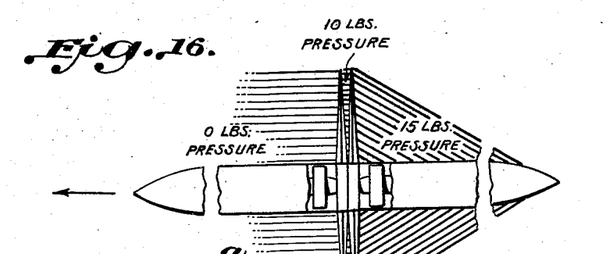
Fig. 16 is a diagrammatic illustration of how two propellers placed close together and rotating in opposite directions coact to increase efficiency, particularly at high speeds.

Fig. 16 illustrates diagrammatically the relative pressure areas resulting from positioning of oppositely rotating propellers intermediate of a fuselage or hollow body. When two propellers are placed close together and operated in opposite directions as here shown, a straightening action ensues with respect to the air, the latter being forced rearwardly in a straight line. Another advantage is that when the air is forced straight back, the tail assembly is more efficient as the air is not turbulent and pressure is substantially equalized over all surfaces. When the propellers operate close together and in opposite directions their action may be compared to two-stage water pumps, the first propeller building up a certain amount of pressure which is increased by the action of the second propeller, assuming that the latter is close enough so that pressure does not leak out around the outside of the propeller area.

Figure 16A:
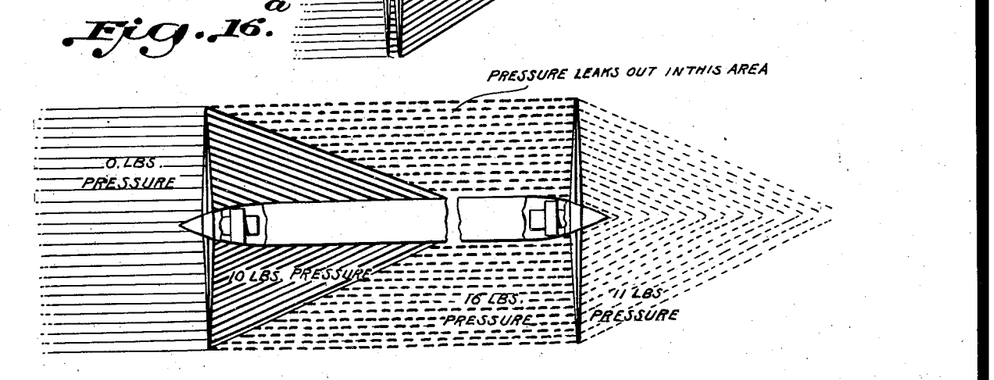
Fig. 16a illustrates how the efficiency decreases when the propellers are spaced a material distance from one another.

Fig. 16a illustrates how the efficiency is reduced when the propellers are spaced a material distance from one another or at opposite ends of a hollow body. Note that in this instance there is a pressure leak in the area between the propellers. Tests indicate that propellers operating close together and in opposite directions as illustrated in Fig. 16 reach peak efficiency at approximately 450 miles per hour, whereas propellers operating in opposite directions but spaced relatively far apart as in Fig. 16a, reach peak efficiency at approximately 350 miles per hour.

The specific pounds pressure indicated in Figs. 16 and 16a are simply illustrative of the relative differences between different areas affected by propellers.

Figure 17:
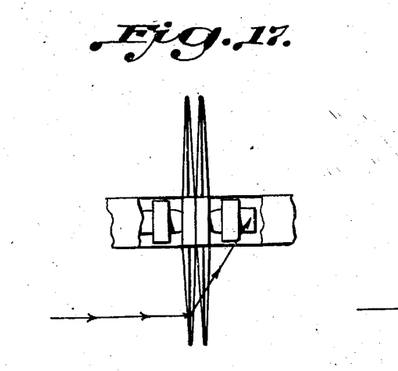
Figs. 17 and 17a are further diagrams illustrating, respectively, the trend of the air currents when acted on by two closely-disposed propellers rotating in the same direction, and when acted on by two propellers rotating in opposite directions.
Figure 17A:
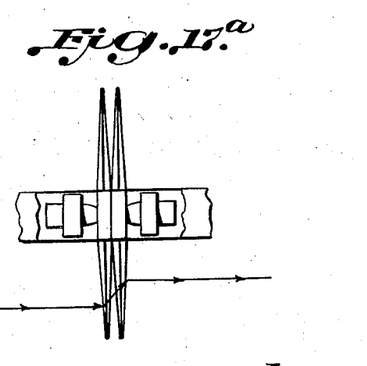

Figs. 17 and 17a represent diagrammatically the action of two propellers spaced close together and rotating in the same direction (Fig. 17) and two propellers spaced in a like manner but rotating in reverse directions (Fig. 17a). In Fig. 17, where the propellers rotate in the same direction, the air tends to rotate around the hollow body immediately in rear of the propellers, whereas when they rotate in opposite directions, the air is taken by the second propeller and forced straight back with a minimum of turbulence.

My improved design permits the engines or motors to be mounted face to face and close together, with the propellers also mounted in close relation and rotating in opposite directions, resulting in a reduction in drag and a marked increase in efficiency, particularly at high speeds. Another feature to be noted is that the motors can be more readily protected from fire, since the compartment which houses the motors can be shut off from the outside air and chemicals and other smothering agencies placed near the motors for release and use when required.

A common difficulty encountered in planes wherein the tips of the wings are free are the so-called "tip vortices," and which are apparently caused by the transfer of pressure from the lower to the upper surfaces over the low pressure area adjacent the outer end of the wing. The outer reinforcing tubes 24 and 24' with their fins 24a have the effect of streamlining the tip of each wing so that pressure at this point is substantially constant and loss of effective wing area is materially reduced. These tubes present a clean surface to the air stream which tends to eliminate turbulent air movements. Thus, these tubes not only support the plane and provide channels for circulation of air but also decrease tip loss with little or no increase in drag.

Figs. 7, 8 and 9 illustrate how my improved construction adapts itself to practically unlimited sizes of airplanes. In these figures, the central hollow body or fuselage is generally indicated at 60 and has projecting laterally therefrom a series of lifting surfaces in the form of wings or wing spars 61, 61', 62, 62'. The wings 61, 61', and 62, 62' are connected alternately at different levels to the central hollow body or fuselage 60 with the upper and lower sets substantially in alignment, both sets projecting laterally outwardly in converging relation and being connected at their outer ends to reinforcing tubes 63 and 63'. It will be noted that the wings are thus arranged in truss formation and to further reinforce the structure, a plurality of intermediate tubes 64, 65, 66 and 67 may be connected longitudinally of the wings and extend from one end of the plane to the other.

Instead of mounting the motors and propellers in the central hollow body or fuselage 60, they are mounted at spaced points along the intermediate tubes 64—67, the propellers being indicated at 68. The motors may be mounted within these tubes in substantially the same manner as the motors 15, 16 are mounted within the central hollow body or fuselage of Figs. 1 and 2, and the air circulating and cooling system may also be constructed in substantially the same manner. Since the wings or wing spars are supported on both ends, they require less weight for equal lift of square foot of wing area than would be required in the conventional type of plane. The tail piece of the central hollow body or fuselage may be provided with a rudder 69 and a stabilizer 70 which may, if desired, be in the form of a main flap. However, in this instance it is preferred to mount a plurality of flaps 71 in the trailing edges of all or any selected number of the wings or wing spars 61—62' and effect control of the plane in the manner indicated in Fig. 11; note in this latter figure how the ailerons may be manipulated to cause the plane to climb or drop without changing its angular position with respect to the horizontal and how also the plane may be caused to climb or dive.

With this type of airplane construction, practically unlimited sizes may be obtained. Additional power does not add drag, and a large number of engines increase the safety factor. To add wing area it is not necessary to increase the length of the wing or wing spars beyond an economical point or to increase the wing chord beyond economical construction.

This type of plane is well adapted for the full utilization of both dynamic and induced lift forces, due to the fact that the wings are between the fuselage and the outside reinforcing tubes where large size ailerons or flaps can be used without undue strain.

Motors and control flaps can be used in landing with the power on since the force of the propellers will keep the plane up at slow speeds when high flap lift and high flap drag are used in landing. It is unnecessary to balance the plane on one center of pressure, and thus the fuselage can be made longer and narrower and this will decrease drag, particularly on large planes as it is necessary to streamline in one direction only.

To facilitate fabrication of the plane in varying sizes and as an advantageous manufacturing feature in general, the outer reinforcing tubes 24, 24' of Fig. 1, or the tubes 63—67 of Fig. 7, may be jointed as indicated at 71 and 71', respectively, so that the parts may be made in sections, each section including one or more wings. These joints may be made by riveting, welding or in any other suitable manner.

My improved design has an important advantage from a manufacturing standpoint. For example, the finned tubes 24 and 24' may be made from a matched pair of stampings, and what is more important, the wing stampings may be uniform throughout with each wing made up of a pair of stampings. This not only simplifies manufacture but also reduces engineering and design costs.

Various types of controls may be adopted for the ailerons. However, it is preferred to use a control whereby the ship will be automatically maintained in horizontal position during normal flight travel and may be caused to climb or drop at the will of the pilot while maintained in such position. Such type of control is illustrated in Figs. 18, 19 and 20.

Figures 18, 19, 20:
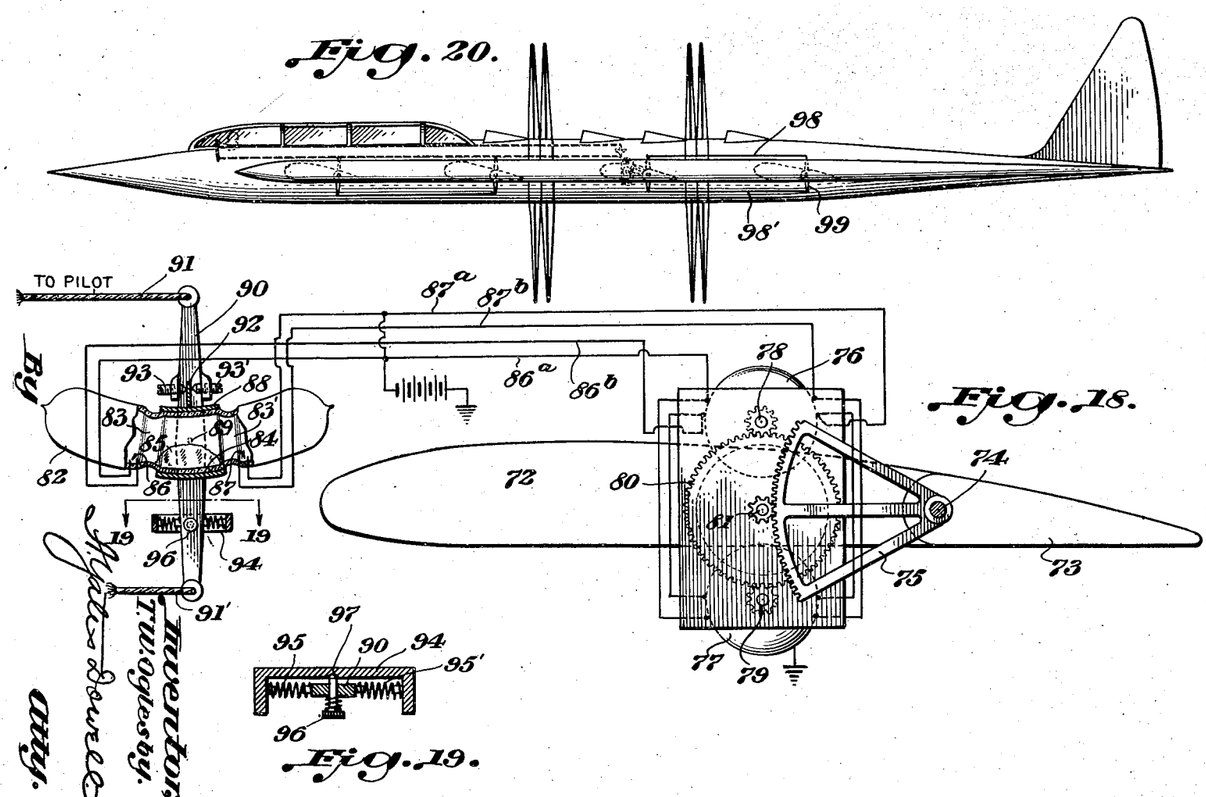
Fig. 18 is a view in sectional side elevation of a type of apparatus which may be used to control the ailerons together with wiring diagram.
Fig. 19 is a section on the line 19—19, Fig. 18.
Fig. 20 is a view in side elevation of the airplane of Figs. 1 to 4, inclusive, showing how the ailerons may be operated from a common control.

First referring to Fig. 18, one of the wings of the plane is here indicated at 72 and has pivoted at the trailing edge thereof an aileron or wing flap 73 which is secured on a shaft 74, mounted in bearings in a recessed portion of the wing. Secured on the shaft 74 is a segmental gear 75 which is driven from motors 76 and 77 through suitable reduction gearing, including pinions 78 and 79 in mesh with gear 80, the latter being secured on shaft 81 provided with pinion 81' in mesh with the segmental gear 75.

The motors 76 and 77 are preferably of the direct current reversible type and controlled through the medium of a fluid or mercury switch comprising tube 82, which is of overall arcuate formation having on opposite sides of the central portion thereof annular depressions defining raised portions or ridges 83 and 83'. Between these annular recessed portions the tube is formed with a depression or well 84 adapted to receive a globule of mercury 85. The globule of mercury is of such volume or size as to normally maintain itself within the confines of the well 84 under skin tension when the tube 82 is in a substantially horizontal position, but when the tube is rocked to a predetermined angular position with respect to the horizontal, the skin of the globule is stretched or expanded permitting the mercury to bridge pairs of contacts 86 and 87, depending upon the direction in which it is rocked. The contacts 86 are connected by wires or electrical conduits 86a and 86b to one side of the motors 76 and 77, while the contacts 87 are connected through similar wires or conduits 87a and 87b to the opposite or reverse sides of the motors 76 and 77.

The tube 82 is mounted in a cradle assembly including holder 88 which is pivoted at 89, said holder having connected thereto an arm 90 which is under manual control of the pilot by means of cables 91 and 91'.

To maintain the tube 82 in the desired position and to govern the sensitivity of control, the holder 88 is provided with a contact member in the form of a projection rib 92, and the arm 90 is provided with set screws 93 and 93' adjustable with respect to the projection 92 to determine the position of said tube with respect to said arm or to permit a certain amount of play between these parts.

To automatically maintain the tube 82 in its predetermined horizontal position when not under direct control of the pilot, centering means is provided and includes a relatively stationary bracket 94, note also Fig. 19, having mounted therein springs 95 and 95' which are anchored at their outer ends to the bracket and at their inner ends are connected to the lever 90. A centering or detent member 96 is projected through the lower extremity of the lever 90 and is adapted to center itself in a recess or depression 97 formed in the face of the bracket 94.

In operation, the pilot may rock the lever 90 to vary the position of the tube 82 and selectively bridge the contacts 86 or 87 and close the circuits to the motors 76 and 77 to drive the latter in reverse directions and thereby control the position of the ailerons or wing flap 73.

The control of an entire group of wing flaps or ailerons may be had from a common point, as for example, a selected flap, and this flap connected by cables 98 and 98' and arms 99 to the entire group of flaps, note Fig. 20, which diagrammatically illustrates the hookup.

Figure 11:
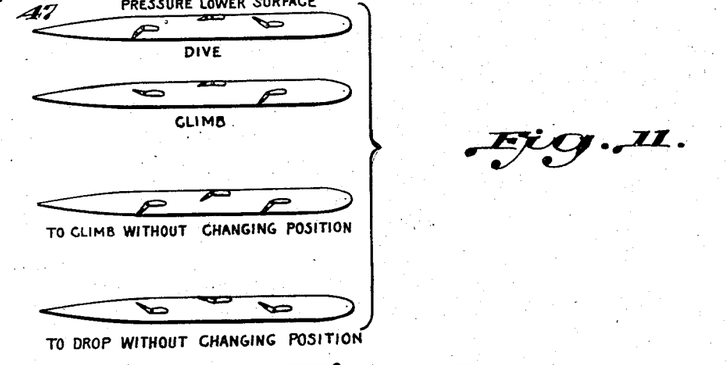
Fig. 11 illustrates how the plane may be controlled by manipulating the ailerons, and wing flaps.

If reference is had to Figs. 11 and 20 in conjunction with Fig. 18, the operation will be readily understood. Thus the ship may climb without changing its angular position with respect to the horizontal and also drop without changing such position. If the pilot wishes to maneuver by going into a nose dive or climb, the flaps may be controlled in individual groups so that the angular position with respect to one another may be varied. However, elevators are not necessary in an airplane of this type. Also, the ship can be turned without a rudder by first rolling the plane with the ailerons and then turning the plane by using the front and rear lift surfaces as a rudder.

Figs. 21 to 24 inclusive illustrate a combined wing flap and air inlet and exhaust valve arrangement. In these figures the central hollow body is indicated at 100 and has mounted therein motors 101 and 102 which face one another and are provided with propellers 103 and 104. A pair of front or leading wings are indicated at 105 and a set of trailing wings at 106, the reinforcing tubes which join these wings being indicated at 107.

Each of the front or leading set of wings is provided with an air inlet valve and wing flap 108 which is adapted to control the amount of air entering a valve opening or port 109 formed in the upper wall of the wing, the said combined valve and flap member being curved forwardly so as to guide the air into said port. This flap has a contour such as will lower the pressure on the upper surface of the wing and thereby increase the lift. A coacting combined wing flap and valve member 110 is mounted in the trailing wing 106 and is adapted to control an exhaust port 111 formed in the bottom wall of the wing, and to also increase lift by increasing the pressure on the lower surface of the trailing wing. The valve flaps 108 and 110 are provided with control levers 112, 113, which are preferably connected up for combined manual and automatic control. Where the front flaps open against the wind, the type of control illustrated in Figs. 21 and 24 may be adopted, the ends of levers 112 and 113 being connected by cables 114 and 115 for movement in unison. The lever 112 has connected thereto a rod or link 116 which is actuated from motor 117 through crank arm 118. A relay 119 is connected to the motor 117 by means of an electrical circuit, said relay in turn being automatically controlled by thermostat 120 and/or by means of an electrical circuit 121 leading to the pilot's compartment.

Figure 21:
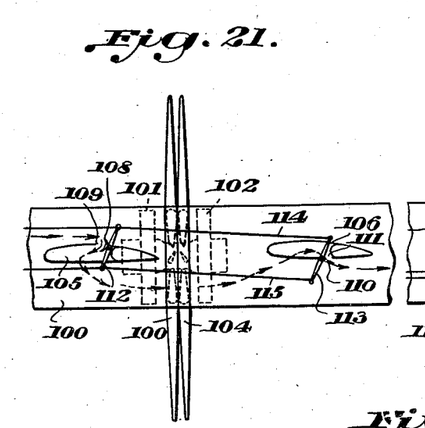
Figure 21 is a fragmentary view in side elevation of a portion of an airplane, illustrating a combined wing flap and air inlet and exhaust valve construction.
Figure 22:
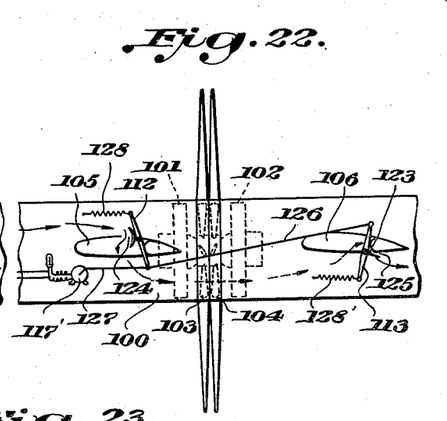
Fig. 22 is a view similar to Fig. 1 but showing a slightly different arrangement of said valve flaps.
Figure 23:
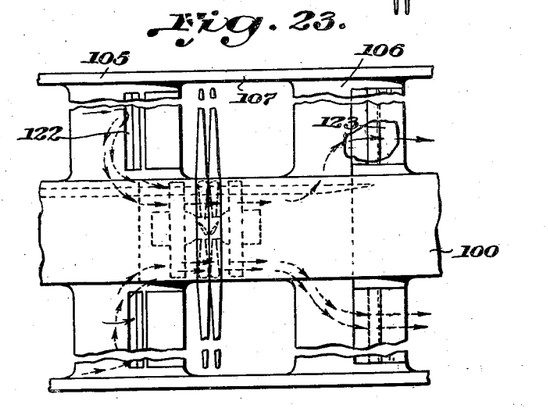
Fig. 23 is a top plan view of Fig. 22.
Figure 24:
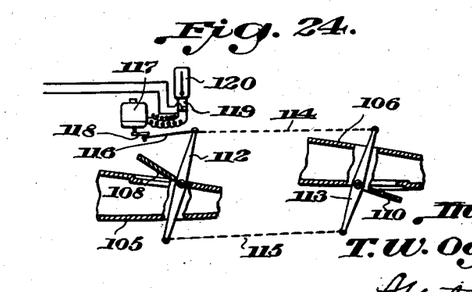
Fig. 24 illustrates diagrammatically electrical control mechanism for operating the combined wing flaps and air valves.

In Figs. 22 and 23 air control valves 122 and 123 are shown having substantially the same function as valve flaps 108 and 110 of Figs. 21 and 24, except that in this instance the valve of the leading wing does not open against the resistance of the wind, forced draft from the propeller being depended upon primarily to step up air circulation, note that valve flap 122 opens inwardly to control port 124 while valve flap 123 opens outwardly and downwardly to control port 125. When the trailing wing valve flaps open they cause a pronounced draft effect or pull through the ports which they control. In this instance, the levers 112 and 113 may each be connected at one end to a cable 126 which is extended in the form of a link 127 to the crank arm of motor 117', which may be controlled in a manner similar to the motor 117 of Fig. 26. The valves 122 and 123 may be closed against the resistance of springs 128, 128'.

Combined wing flaps and air valves of the type shown in Figs. 21 to 24 inclusive are primarily adapted for use on the take off and landing periods to increase the lift of the wings at that time and at the same time step up the circulation of air under low speeds. However, the control may obviously be used at any time.

Fig. 23 illustrates the circulatory path of the air currents from the ports in the leading wings through the passages defined by the hollow wings, and central body or motor compartment, and thence out through the trailing wings and the ports in the lower walls of the latter.

Figure 25:
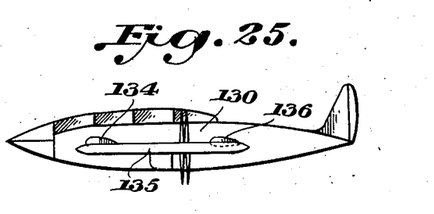
Figs. 25, 26 and 27 are views, respectively, in side elevation, plan and end elevation of a small airplane of the private passenger type constructed in accordance with the invention.
Figure 26:
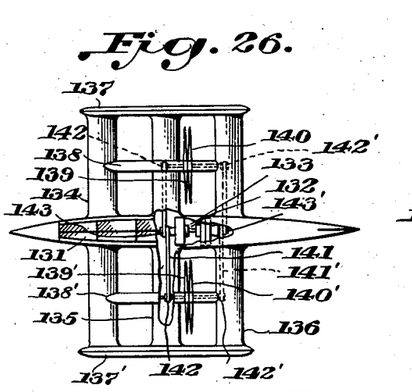
Figure 27:
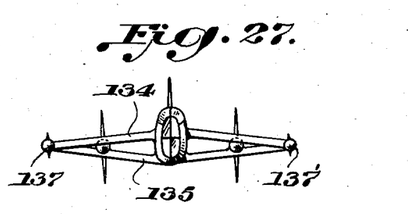

Figs. 25, 26 and 27 illustrate how my improved aircraft construction can be readily adapted to small planes, such as private passenger types. In this instance the central hollow body or fuselage is indicated at 130 and is provided with a passenger or pilot compartment 131 and a motor compartment 132 mounting a pair of motors 133. The wings or wing spars are indicated at 134, 135 and 136, there being three used in this small model connected in line at their outer ends by reinforcing tubes 137, 137' and at an intermediate point by tubes 138 and 138'. The wings may be made of one or more pieces of metal stamped or welded to one or more relatively light spars or reinforcing tubes.

These figures also illustrate a type of propeller mount and drive which may be found desirable in an airplane of the type contemplated herein. The two motors shown at 133 drive propellers 139, 139' and 140, 140' through V belts 141, 141' and outer and inner sets of variable speed pulleys 142, 142' and 143, 143', the inner sets of pulleys being mounted on the drive shafts of the motors and the outer sets of pulleys being mounted on the propeller drive shafts. The front motor drives the rear propellers 139, 139' of each pair and the rear motor drives the rear propellers 140, 140' of each pair. The variable speed pulleys are preferably arranged for adjustment from the cockpit. By varying the speed of the propellers with the motor speed, the same results can be achieved as are obtained with variable pitch propellers which are much more expensive and complicated. The intermediate reinforcing tubes 138, 138' serve as housings for the propeller drive shafts.

It will be noted that the wings are arranged in truss formation which together with the reinforcing tubes give a marked degree of strength with minimum weight.

Figures 28, 29:
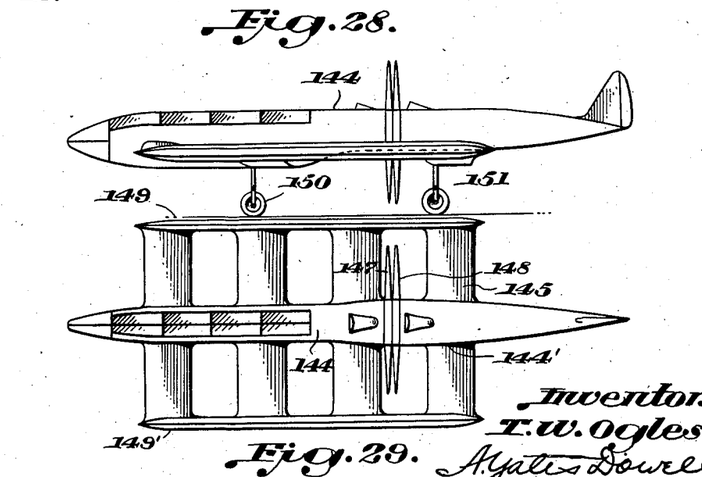
Figs. 28, 29 and 30 are also views in side elevation, plan and end elevation of a low-wing truss type plane with motors in line.
Figure 30:
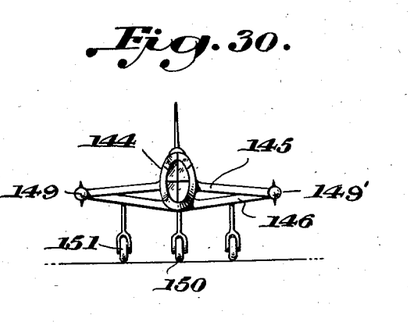

Figs. 28, 29 and 30 illustrate a low wing truss type of plane using a pair of motors in line and arranged to permit a short-span landing gear with large diameter propellers. In this instance the central hollow body or fuselage is indicated at 144 and has projecting therefrom a series of wings or wing spars 145 and 146 arranged in truss formation with the lower set of wings 146 connected at their inner ends to the bottom of the fuselage and the inner ends of the upper set of wings 145 connected at a point just below the longitudinal center of the fuselage. The fuselage is preferably enlarged in diameter at an intermediate point, to provide a motor compartment 144', the motors (not shown) being arranged in line and mounting a pair of propellers 147 and 148. The wings are reinforced by outer streamlined reinforcing tubes 149 and 149'.

It will be noted that the landing gear, indicated at 150 and 151, occupies a relative short overall space. The gear should be of such height as to permit large diameter propellers of ample capacity. The fuselage is shaped for maximum streamline efficiency in its front section consistent with comfort and gradually merges into the motor compartment, which may be enlarged to accommodate the motors.

It will be understood that the foregoing description and illustrations in the drawings are not to be construed as limiting features, nor has any attempt been made herein to enumerate all advantages of my improved plane. Also, the features of novelty are not to be determined by the disclosure in its more specific form but by the scope of the claims appended hereto.

What is claimed is:

1. In an airplane, a central elongated hollow body providing a fuselage, wings of hollow construction joined at their inner ends to said body and projecting laterally outwardly therefrom, hollow reinforcing members connecting the outer ends of said wings, said hollow body, wings and reinforcing members defining communicating ducts for circulating air to provide a cooling or heat transfer system for transferring heat in the body section through the wings and reinforcing members.

2. In an airplane, a central elongated hollow body providing a fuselage and a motor compartment, motors mounted in said compartment and provided with propellers extending radially outwardly therebeyond, a plurality of wings of hollow construction joined at their inner ends to said hollow body and projecting laterally outwardly therefrom, and hollow tubular reinforcing members connected to the outer ends of said wings and rigidly bracing the latter, the motor compartment, wings and reinforcing members defining communicating air circulating ducts forming part of a cooling system for the motors.

3. In an airplane, a central elongated hollow body providing a fuselage and a motor compartment, motors mounted in said compartment and provided with propellers extending radially outwardly beyond the compartment, a plurality of wings of hollow construction joined at their inner ends to said hollow body and projecting laterally outwardly therefrom, hollow tubular reinforcing members connected to the outer ends of said wings and rigidly bracing the latter, the hollow body, wings and reinforcing members defining communicating ducts for circulating air forming part of a cooling system for the motors, and means for establishing a forced circulation of air through said system.

4. In an airplane, a central elongated hollow body, providing a fuselage and a motor compartment, motors mounted in said compartment and provided with propellers having hubs rotating in said compartment and blades extending radially outwardly beyond the compartment, a plurality of wings of hollow construction joined at their inner edges to said hollow body and projecting laterally outwardly therefrom, hollow tubular reinforcing members connected to the outer ends of said wings and rigidly bracing the latter, the motor compartment, wings and reinforcing members defining communicating ducts for circulating air forming part of a cooling system for the motors, and means for establishing a forced circulation of air through the system including fan blades mounted within the hubs of the propellers.

5. In an airplane, a central elongated hollow body providing a fuselage and motor compartment, hollow wings joined at their inner ends to said fuselage and projecting laterally outwardly therefrom, elongated hollow tubular reinforcing members joined to the outer ends of said wings and rigidly reinforcing the latter, one or more motors mounted in said motor compartment and provided with drive shafts, propellers mounted on said shafts and having propeller blades projecting radially outwardly beyond the hollow body, said propellers having hubs located within the motor compartment, and fan blades mounted in said hubs to establish a forced circulation of air through said motor compartment and thence outwardly through said wings into said tubular reinforcing members and back to said motor compartment.

6. In an airplane, a central elongated hollow body providing a fuselage and a motor compartment, hollow wings joined at their inner ends to said fuselage and projecting laterally outwardly therefrom, said wings at their outer ends being arranged in substantial alignment, hollow tubular reinforcing members joined to the outer ends of said wings holding the latter in rigid aligned relation, the motor compartment together with said wings and reinforcing members forming a series of ducts for circulating air to effect cooling of the latter, a pair of motors mounted in said motor compartment and having rotating propeller shafts, individual propellers mounted on said shafts and arranged to rotate in reverse directions, said propellers having hubs carrying blades shaped to coact with one another to effect unidirectional propulsion, and fan blades mounted in said hubs and providing means for establishing a forced circulation of air through said ducts.

7. In an airplane, a central elongated hollow body providing a fuselage and a motor compartment, hollow wings joined at their inner ends to said hollow body and projecting laterally outwardly therefrom, said wings at their outer ends being arranged in substantial alignment, hollow tubular reinforcing members joined to the outer ends of said wings and holding the latter in rigid aligned relation, the motor compartment together with said wings and reinforcing members forming a series of ducts for circulating air to effect cooling of the latter, a pair of motors mounted in said motor compartment and having rotating propeller shafts projecting toward one another, individual propellers mounted on said drive shafts and arranged to rotate in reverse directions, said propellers having blades shaped to coact with one another to effect unidirectional propulsion, the central portions of said propellers carrying fan blades which rotate within the motor compartment and provide means for establishing a forced circulation of air through said ducts, and adjustable vanes for directing the air from the motor compartment into said hollow wings.

8. In an airplane, a central elongated hollow body providing a fuselage and motor compartment, hollow wings joined at their inner wings to said hollow body and projecting laterally outwardly therefrom, hollow tubular reinforcing members joining the outer ends of said wings and rigidly reinforcing the latter, said motor compartment, hollow wings and reinforcing members providing a series of ducts forming part of a cooling system to effect cooling of the air, motors mounted in said motor compartment and provided with propellers projecting radially outwardly beyond said compartment, and means for admitting predetermined amounts of atmospheric air into said system.

9. In an airplane, a central elongated hollow body providing a fuselage and motor compartment, hollow wings joined at their inner wings to said hollow body and projecting laterally outwardly therefrom, hollow tubular reinforcing members joining the outer ends of said wings and rigidly reinforcing the latter, said motor compartment, hollow wings and reinforcing members providing a series of ducts forming part of a cooling system to effect cooling of air, motors mounted in said motor compartment and provided with propellers projecting radially outwardly beyond said compartment, and means for admitting atmospheric air into said system including adjustable vanes disposed at opposite extremities of the motor compartment and arranged to control ports formed in the wall of said hollow body.

10. In an airplane, a central elongated hollow body providing a fuselage and motor compartment, hollow wings joined at their inner ends to said fuselage and projecting laterally outwardly therefrom, hollow tubular reinforcing members joining the outer ends of said wings and rigidly reinforcing the latter, said motor compartment, hollow wings and reinforcing members providing a series of ducts forming part of a cooling system to effect cooling of air, motors mounted in said motor compartment and provided with propellers projecting radially outwardly beyond said compartment, and means for admitting atmospheric air into said system including adjustable vanes disposed at opposite extremities of the motor compartment and arranged to control ports formed in the wall of said hollow body, said vanes being arranged to deflect atmospheric air into the motor compartment at the forward end of the latter and to deflect air from said compartment to the atmosphere at the rear extremity of said compartment.

11. In an airplane, hollow wings or wing spars arranged in trailing relation, a series of elongated hollow tubes extending longitudinally of the plane and connected to said wing spars to rigidly reinforce the latter, and to provide with the wings communicating ducts for a cooling system, means for propelling the plane including a pair of motors mounted in one of said tubes, said motors facing one another and having propellers projecting radially beyond the tube in which the motors are mounted, said propellers rotating in opposite directions to provide a gyroscopic action and assist in balancing the plane when in flight and having blades arranged to coact with one another to effect unidirectional propulsion.

12. In an airplane, a central elongated hollow body, a series of wings connected at their inner ends to said body and projecting laterally outwardly therefrom, hollow reinforcing tubes connecting the outer ends of said wings and holding the latter in rigid substantially aligned relation, the inner ends of said wings at the point where they connect to said fuselage being arranged in staggered relation to provide a trussed construction.

13. In an airplane, a central elongated hollow body, a series of wings connected at their inner ends to said body and projecting laterally outwardly therefrom, hollow reinforcing tubes connecting the outer ends of said wings and holding the latter in rigid substantially aligned relation, the inner ends of said wings at the point where they connect to said body being arranged in staggered relation to provide a trussed construction, and additional reinforcing tubes connecting said wings between said central body and said outer end tubes.

14. In an airplane, a central elongated hollow body providing a fuselage, a series of wings connected at their inner ends to said body and projecting laterally outwardly therefrom, hollow reinforcing tubes connecting the outer ends of said wings and holding the latter in rigid substantially aligned relation, the inner ends of said wings at the point where they connect to said body being arranged in alternate staggered relation to provide a trussed construction, a plurality of flaps mounted in the trailing edge portions of certain of said wings, and means for selectively controlling said ailerons to assist in maneuvering the plane.

15. In an airplane, a central elongated hollow body providing a fuselage and a motor compartment, hollow wings projecting laterally from said fuselage, hollow reinforcing tubes connecting the outer ends of said wings and holding the latter in rigid substantially aligned relation, said hollow body, wings and reinforcing tubes providing a circulatory cooling system, means for propelling the plane including a motor mounted in said motor compartment and having propeller blades projecting radially outwardly beyond said compartment, means operated by said motor for circulating a cooling medium through the cooling system, and ailerons mounted within the trailing edges of at least a pair of said wings and controlled from the fuselage to assist in maneuvering the plane.

16. An airplane comprising a central elongated hollow body providing a fuselage and motor compartment, a plurality of hollow wings joined at their inner ends to said fuselage and projecting laterally outwardly therefrom, said wings being arranged in trailing substantially aligned relation, hollow reinforcing tubes connected to the outer ends of said wings, motors mounted in said motor compartment, said motors being arranged in pairs facing one another and having reversely rotating propeller shafts with propellers thereon, each pair of propellers having blades projecting radially outwardly beyond said motor compartment and shaped to effect unidirectional propulsion, said propellers having hubs rotating within the motor compartment, fan blades mounted in said hubs to establish a forced circulation of air through the motor compartment and thence outwardly through said wings and tubes and back to said compartment, means for admitting controlled amounts of atmospheric air into the system and coacting means for releasing controlled amounts of heated air from the system, there being a pair of propellers between the second and third wings of the plane to thereby bring the first and second wings within the area of pressure affected by the rotating propellers to avoid turbulent air currents.

17. In an airplane, a central elongated hollow body providing a motor compartment, hollow wings projecting laterally from said body, hollow reinforcing tubes connected to outer ends of said wings and holding the latter in rigid substantially aligned relation, a pair of motors mounted in and enclosed by said hollow body, said motors being positioned at a point intermediate the ends of said body and in axial alignment, propellers operated by said motors and arranged closely adjacent to and facing one another and rotating in reverse directions but shaped to exert a unidirectional propelling force on the air, said hollow body, wings and tubes providing a circulating conduit, and means driven by said motors for circulating a cooling medium therethrough.

18. In an airplane, a central elongated hollow body providing a motor compartment, hollow wings projecting laterally from said body, hollow reinforcing tubes connected to outer ends of said wings and holding the latter in rigid substantially aligned relation, said tubes being of streamlined contour and having fins projecting outwardly therefrom and extending longitudinally thereof to prevent air turbulence or "tip vortices" at the outer ends of the wings.

19. In an airplane, an elongated hollow body, hollow wings projecting laterally from said body, the hollow wings and body defining communicating passageways forming part of an air circulating and cooling system for the airplane, motors in said body and mounting propellers having blades projecting radially beyond said body, combined wing flaps and air valves hingedly mounted in the top walls of a pair of leading wings and controlling air-inlet ports formed in said walls and like wing flaps and air valves mounted in the lower wall of a set of trailing wings and controlling exhaust ports formed in said latter walls, and means for controlling said combined flaps and valves to assist in maneuvering the plane and to also establish a forced circulation of air through said wings and body.

20. In an airplane, an elongated hollow body, hollow wings projecting laterally from said body, the hollow wings and body defining communicating passageways forming part of an air circulating and cooling system for the airplane, motors in said body and mounting propellers having blades projecting radially beyond said body, combined wing flaps and air valves hingedly mounted in the top walls of a pair of leading wings and controlling air-inlet ports formed in said walls and like wing flaps and air valves mounted in the lower wall of a set of trailing wings and controlling exhaust ports formed in said latter walls, and means for controlling said combined flaps and valves to assist in maneuvering the plane and to also establish a forced circulation of air through said wings and body, the combined wing flaps and valves of the leading wings opening outwardly and upwardly in the direction of travel of the airplane to "scoop" the air into said inlet ports and increase the lift of the wings and the combined wing flaps and valves of the trailing wings opening outwardly and downwardly away from the direction of travel to induce a draft through the system and increase the pressure on the lower surfaces of the wings.

21. In an airplane, a central elongated hollow body, hollow wings projecting laterally from said body, elongated hollow members connected to and reinforcing the outer ends of said wings, motors mounted in said body and provided with propellers having blades projecting radially beyond said body, said wings and body defining communicating passageways forming part of a cooling system for the motors, combined wing flaps and air valves disposed in the top walls of at least one pair of leading wings and arranged to control air-inlet ports formed in said walls, like wing flaps and air valves mounted in the bottom walls of at least one pair of trailing wings and controlling air exhaust ports formed in said latter walls, and means for automatically controlling said combined flaps and valves to assist in maneuvering the plane and to also establish a forced circulation of air through said system.

22. In an airplane, a central elongated hollow body providing a fuselage and a motor compartment, a plurality of wings projecting laterally outwardly from said body, reinforcing tubes connecting the outer ends of said wings and maintaining the latter in aligned relation, intermediate hollow reinforcing tubes connecting said wings, propellers rotatably mounted in and having blades projecting radially beyond said latter reinforcing tubes, and one or more motors mounted in said motor compartment and having an operative drive connection through said hollow wings with said propellers.

23. In an airplane, a central elongated hollow body providing a fuselage and a motor compartment, a plurality of wings projecting laterally outwardly from said body, reinforcing tubes connecting the outer ends of said wings and maintaining the latter in substantial aligned relation, intermediate hollow reinforcing tubes also connecting said wings, pairs of propellers rotatably mounted in and having blades projecting radially beyond said latter reinforcing tubes, the propellers of each pair being mounted in aligned closely spaced relation, a pair of motors mounted in line in said motor compartment and having an operative variable-speed drive connection through said hollow wings with said propellers.

24. In an airplane, wings arranged in substantially horizontally aligned trailing relation, elongated tubular reinforcing members connecting the outer ends of said wings and one or more elongated hollow bodies of materially greater diameter than said reinforcing members connecting the wings longitudinally of the airplane at points along the lateral extent of the wings, said reinforcing members having their leading extremities of streamline contour and provided with fins which project outwardly therefrom and extend longitudinally thereof to prevent air turbulence and tip vortices at the outer ends of the wings.

25. In an airplane, an elongated hollow body providing a fuselage, wings extending laterally from said fuselage and having their outer ends arranged in substantially aligned trailing relation longitudinally of the airplane, reinforcing spars connecting the outer ends of said wings and coacting with said fuselage to hold the wings in rigid aligned relation, and additional reinforcing spars connecting said wings longitudinally of the airplane intermediate said fuselage and said outer reinforcing members.

26. In an airplane, an elongated hollow body providing a fuselage, hollow wings connected at their inner ends to the fuselage and projecting laterally outwardly therefrom, the outer ends of said wings being arranged in substantial alignment longitudinally of the airplane, elongated hollow bodies connected to the outer ends of said wing and coacting with the fuselage to hold the wings in rigid aligned relation, the wings being hollow and open at their inner and outer ends respectively to the fuselage and said reinforcing tubes and the leading edges of the wings being closed.

27. In an airplane, an elongated hollow body providing a fuselage, a series of wings connected at their inner ends to said body and projecting laterally outwardly therefrom and having their outer ends arranged in substantial alignment longitudinally of the airplane, elongated reinforcing members connecting the outer ends of said wings and holding the latter in rigid aligned relation, the inner ends of the wings at the point where they connect to the said hollow body being arranged in alternate staggered relation longitudinally of the body to provide a trussed construction.

28. In an airplane, an elongated hollow body providing a fuselage, wings extending laterally from said fuselage and having their outer ends arranged in substantially aligned trailing relation longitudinally of the airplane, reinforcing spars connecting the outer ends of said wings and coacting with said fuselage to hold the wings in rigid aligned relation, additional reinforcing spars connecting said wings longitudinally of the airplane intermediate said fuselage and said outer reinforcing members, and additional elongated reinforcing members connecting the wings longitudinally of the airplane intermediate said outer reinforcing members and said hollow body.

29. In an airplane, a plurality of wings or wing spars arranged in substantially aligned relation longitudinally of the airplane, one or more elongated reinforcing members including a central elongated hollow body providing a fuselage connecting said wings longitudinally of said plane, said fuselage body being provided with a plurality of motor compartments, motors disposed in said compartments, propellers mounted on said motors and having hubs rotating within the motor compartments and blades extending radially outwardly beyond said hollow body, fan blades mounted in said hubs to establish a forced circulation of air through said hollow body, said propellers being arranged in pairs with the hubs facing one another, and means connecting each pair of hubs and functioning to maintain said hubs in alignment and to stabilize the power system.

30. In an airplane, a central elongated hollow body providing a fuselage and a motor compartment, hollow wings projecting laterally from said fuselage, hollow reinforcing tubes connecting the outer ends of said wings and holding the latter in rigid substantially aligned relation, said hollow body, wings and reinforcing tubes providing a circulatory cooling system, means for propelling the plane including a motor mounted in said motor compartment and having propeller blades projecting radially outwardly beyond said compartment, and means operated by said motor for circulating a cooling medium through the cooling system.

31. An airplane including a fuselage formed of end sections and a plurality of duplicate intermediate sections by the selection of the proper number of which a fuselage of the desired length is obtained, said duplicate sections each having attached thereto at least one wing on each side, with the outer end portions of the wings of the duplicate sections in substantial longitudinal alignment, and reinforcing members connecting the aligned end portions of such wings at each side of the fuselage.

THOMAS WM. OGLESBY.